United States Patent [19]

Martineau

[11] Patent Number: 5,152,564
[45] Date of Patent: Oct. 6, 1992

[54] REFRIGERATOR DOOR LOCK APPARATUS

[76] Inventor: Ronald W. Martineau, 433 Hidden Vista Dr., Chula Vista, Calif. 91910

[21] Appl. No.: 780,963

[22] Filed: Oct. 23, 1991

[51] Int. Cl.⁵ .............................................. E05C 19/18
[52] U.S. Cl. .............................. 292/288; 292/DIG. 71; 292/258; 340/546; 200/61.62; 24/599.9
[58] Field of Search ............... 292/DIG. 71, 288, 258, 292/DIG. 21, 296, 297; 340/585, 586, 543, 546, 542; 200/61.69, 61.62; 24/599.2, 599.9, 600.3

[56] References Cited

U.S. PATENT DOCUMENTS

| 214.861 | 4/1879 | Wooldridge | 292/258 |
|---|---|---|---|
| 694,975 | 3/1902 | Marshall | 292/288 |
| 720,496 | 2/1903 | Simpson | 292/156 |
| 2,151,587 | 3/1939 | Cassileth | 292/288 |
| 3,488,651 | 1/1970 | Brenner | 340/546 |
| 4,006,825 | 2/1977 | Austin et al. | 24/599.2 |
| 4,012,065 | 3/1977 | Miller | 292/288 |
| 4,082,334 | 4/1978 | Volta et al. | 292/288 |
| 4,206,940 | 6/1980 | Altabé | 24/599.9 |
| 4,317,516 | 3/1982 | Palmer-Ball, Sr. | 292/DIG. 71 |
| 4,499,634 | 2/1985 | Zimmardi | 24/599.9 |
| 4,691,195 | 9/1987 | Sigelman | 292/DIG. 71 |
| 4,930,194 | 6/1990 | Frechin | 24/599.9 |
| 5,000,498 | 3/1991 | Upchurch | 292/258 |
| 5,007,263 | 4/1991 | Taylor | 292/288 |

Primary Examiner—Eric K. Nicholson
Attorney, Agent, or Firm—Leon Gilden

[57] ABSTRACT

A "U" shaped door lock is arranged to receive adjacent handles of a refrigerator door therebetween formed of typically "L" shaped configurations and adjacency relative to one another. The door lock apparatus includes spaced parallel legs of deflectable memory retentent material to effect spring back of the legs when directed together, with a modification of the invention to include a latch member mounted at a lower end of the legs requiring deflection of the legs permitting engagement of the latch relative to both legs to receive adjacent door handles of closed "C" shaped configurations. A further modification of the invention includes an audible alarm member mounted to one of the legs actuated upon attempted removal of the lock member relative to the refrigerator handles.

2 Claims, 4 Drawing Sheets

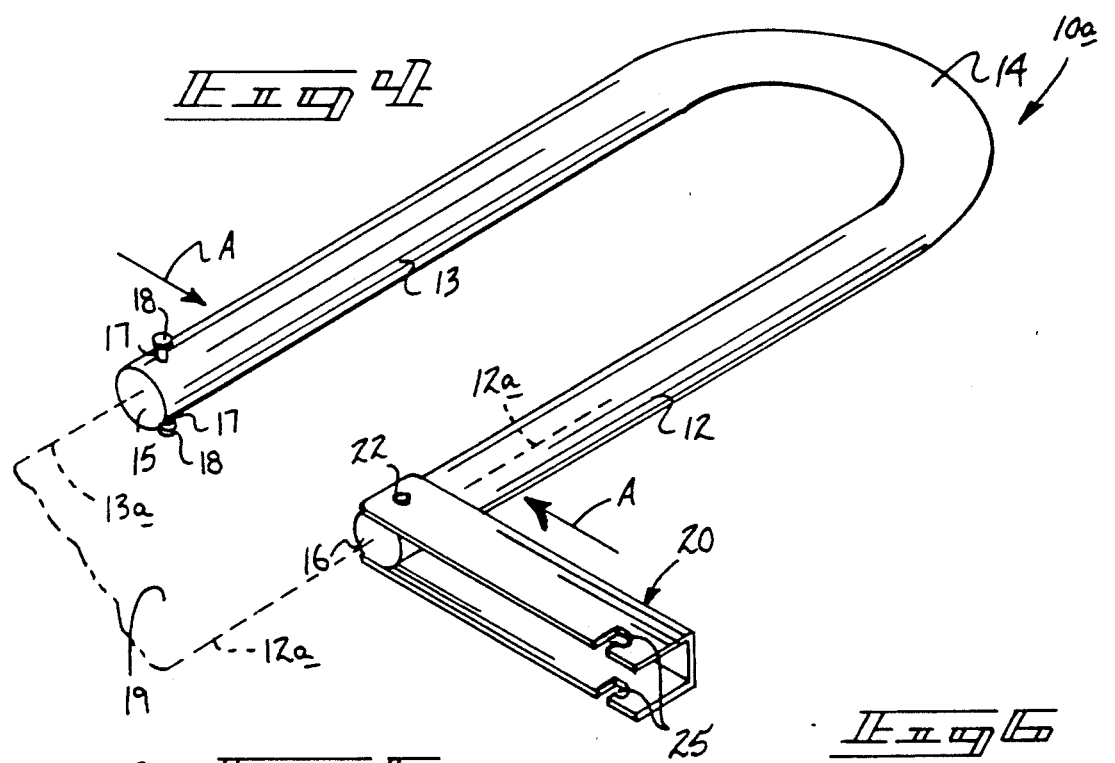
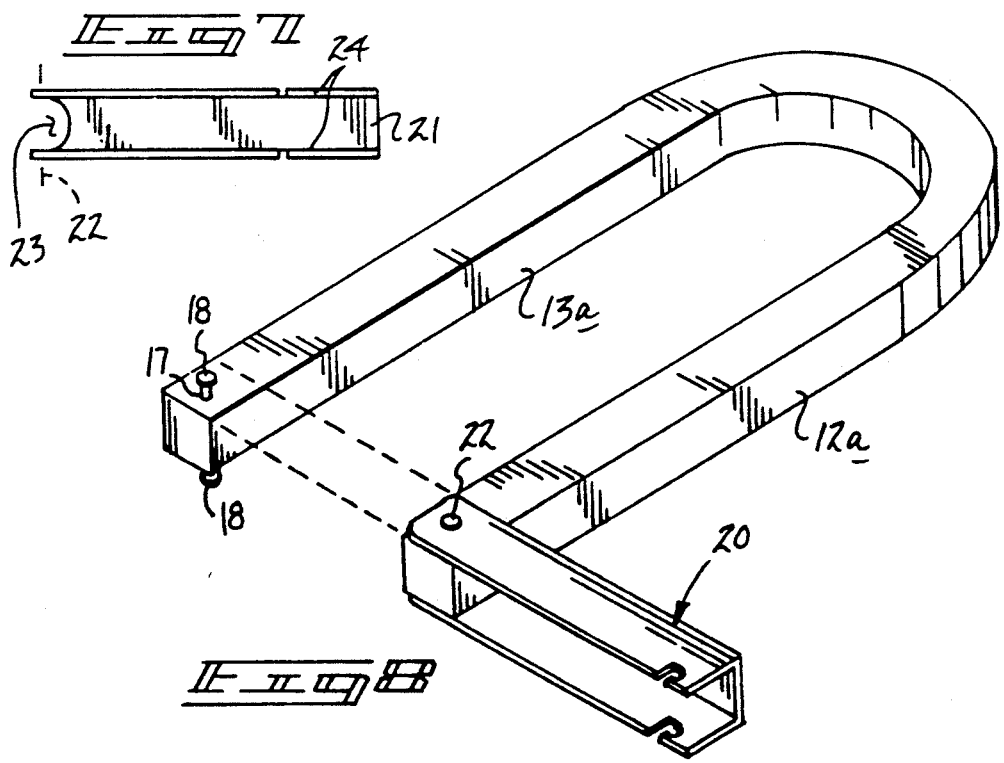

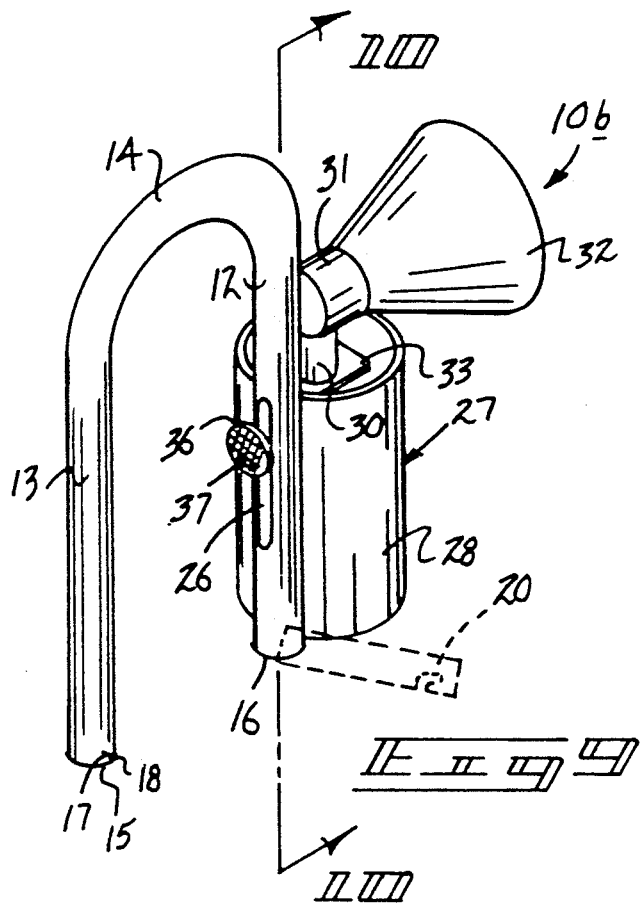
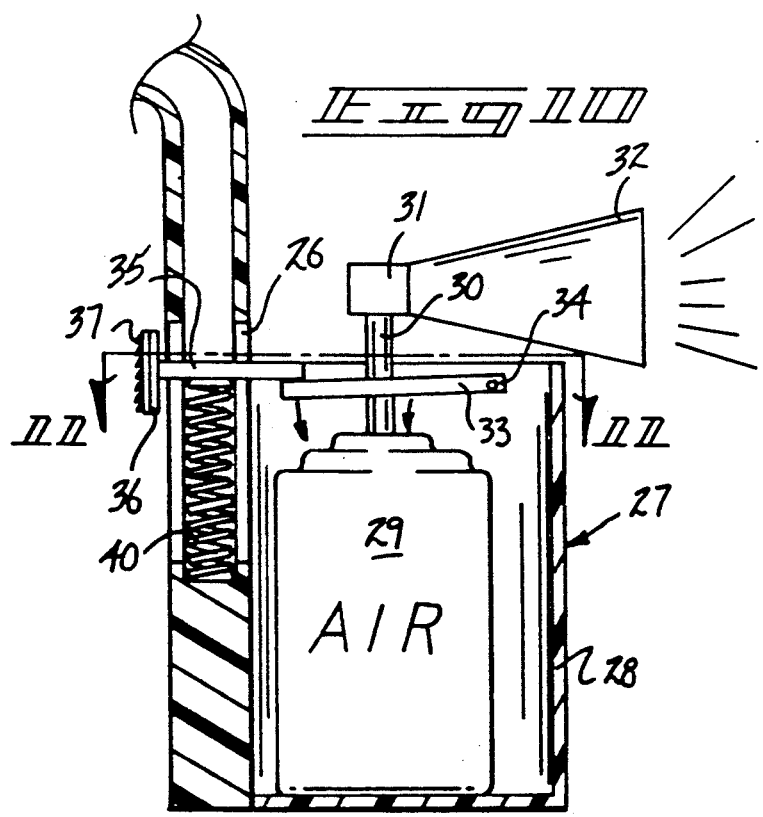

5,152,564

REFRIGERATOR DOOR LOCK APPARATUS

BACKGROUND OF THE INVENTION

1. Field of the Invention

The field of invention relates to appliance locking devices, and more particularly pertains to a new and improved refrigerator door lock apparatus wherein the same is arranged to permit latching and securement of the refrigerator doors limiting unauthorized opening thereof.

2. Description of the Prior Art

Various latching mechanisms are utilized in the prior art to prevent unauthorized opening of appliances. Such apparatus is exemplified in U.S. Pat. No. 2,207,568 to Wild wherein a latch mechanism in cold storage doors is arranged for opening of the door interiorly or exteriorly of the door preventing individuals from being trapped within the cold storage device.

U.S. Pat. No. 4,841,754 to Jones sets forth a dead bolt door handle assembly providing a locking mechanism relative to handles mounted to an interior and exterior surface of a door structure.

As such, it may be appreciated that there continues to be a need for a new and improved refrigerator door lock apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of door lock apparatus now present in the prior art, the present invention provides a refrigerator door lock apparatus wherein the same is arranged for securement to refrigerator doors to prevent their inadvertent and unauthorized opening. As such, the general purpose of the present invention, which will be described subsequently in greater detail, is to provide a new and improved refrigerator door lock apparatus which has all the advantages of the prior art appliance door lock structure and none of the disadvantages.

To attain this, the present invention provides a "U" shaped door lock arranged to receive adjacent handles of a refrigerator door therebetween formed of typically "L" shaped configurations and adjacency relative to one another. The door lock apparatus includes spaced parallel legs of deflectable memory retentent material to effect spring back of the legs when directed together, with a modification of the invention to include a latch member mounted at a lower end of the legs requiring deflection of the legs permitting engagement of the latch relative to both legs to secure doors equipped with closed "C"-shape configuration handles, adjacent to each other. A further modification of the invention includes an audible alarm member mounted to one of the legs actuated upon attempted removal of the lock member relative to the refrigerator handles.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved refrigerator door lock apparatus which has all the advantages of the prior art appliance door lock structure and none of the disadvantages.

It is another object of the present invention to provide a new and improved refrigerator door lock apparatus which may be easily and efficiently manufactured and marketed.

It is a further object of the present invention to provide a new and improved refrigerator door lock apparatus which is of a durable and reliable construction.

An even further object of the present invention is to provide a new and improved refrigerator door lock apparatus which is susceptible of a low cost of manufacture with regard to both materials and labor, and which accordingly is then susceptible of low prices of sale to the consuming public, thereby making such refrigerator door lock apparatus economically available to the buying public.

Still yet another object of the present invention is to provide a new and improved refrigerator door lock apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of a modification of the invention.

FIG. 5 is an orthographic side view of the locking member utilized by the door lock assembly.

FIG. 6 is an orthographic front view of the locking member.

FIG. 7 is an orthographic bottom view of the locking member.

FIG. 8 is an isometric illustration of the invention utilizing a door lock apparatus of a rectilinear cross-sectional configuration.

FIG. 9 is an isometric illustration of a further modification of the invention.

FIG. 10 is an orthographic view, taken along the lines 10—10 of FIG. 9 in the direction indicated by the arrows.

DESCRIPTION OF THE PREFERRED EMBODIMENT

Figure 1:
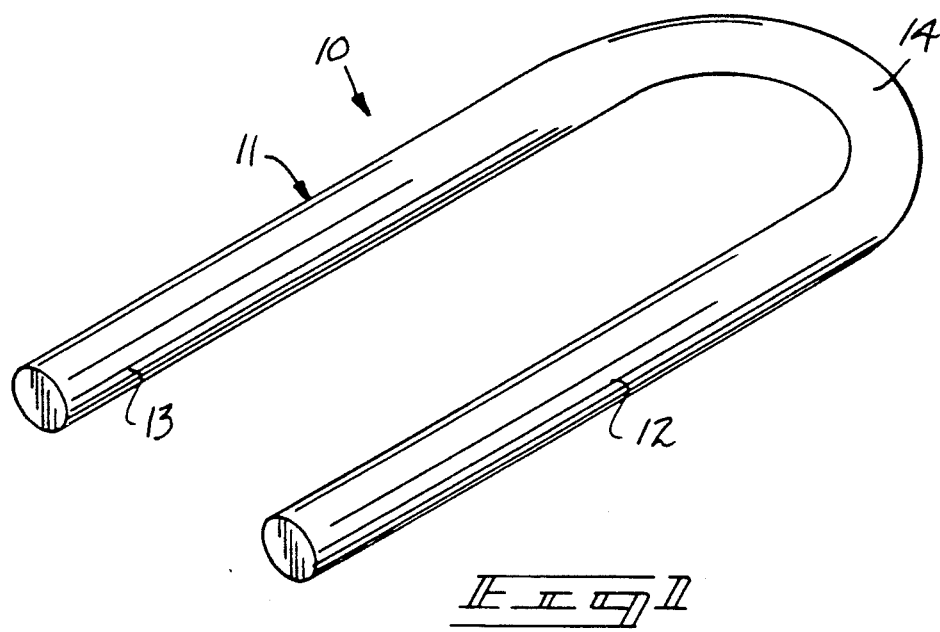
FIG. 1 is an isometric illustration of the instant invention.
Figure 2:
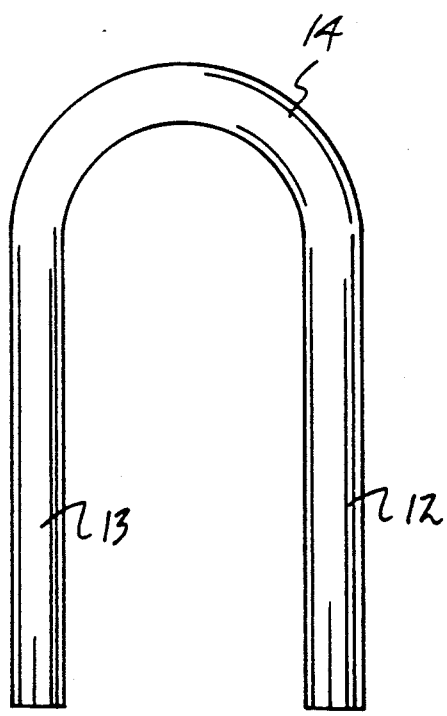
FIG. 2 is an orthographic frontal view of the instant invention.
Figure 3:
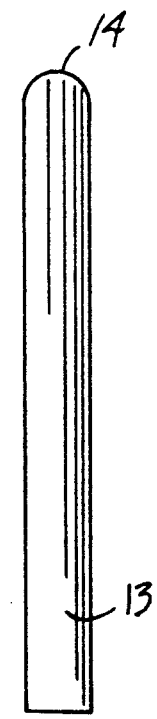
FIG. 3 is an orthographic side view of the instant invention.
Figure 11:
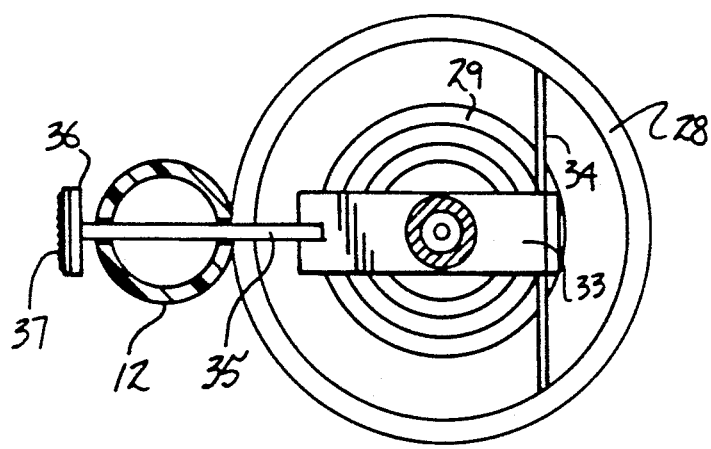
FIG. 11 is an orthogrraphic view, taken along the lines 11—11 of FIG. 10 in the direction indicated by the arrows.

With reference now to the drawings, and in particular to FIGS. 1 to 12 thereof, a new and improved refrigerator door lock apparatus embodying the principles and concepts of the present invention and generally designated by the reference numerals 10, 10a, and 10b will be described.

More specifically, the refrigerator door lock apparatus 10 of the instant invention essentially comprises a "U" shaped door lock 11, including a right leg member 12 spaced from and parallel a left leg member 13. The right and left leg members are formed of a deflectable material of memory retentent configuration, wherein the "U" shaped door lock 11 permits the legs 12 and 13 to be deflected relative to one another, in a manner as illustrated in FIG. 4, by application of the force indicated by the arrows "A", and wherein the legs are governed by spring backed material to return to an original configuration with the legs in a parallel relationship, as illustrated. The right and left leg members 12 and 13 are joined by a connecting web 14 to define a continuous "U" shaped configuration, with the left and right leg members 13 and 12 including respective left and right leg lower distal ends 15 and 16, each defined by a predetermined thickness. Further, each includes a respective right and left axis defined by the respective axes 12a and 13a, wherein the axes 12a and 13a are aligned in a common plane 19. Coaxially aligned pins 17 are integrally secured to the left leg member 13 adjacent the lower distal end 15, wherein the pins 17 each include an enlarged pin head portion 18 at a remote distal end thereof spaced from the left leg member 13. The pins 17 are oriented orthogonally relative to the plane 19. A locking member 20 is pivotally mounted to the right leg 12 about locking member pivot axle 22 that is arranged parallel to the pins 17. The locking member 20 includes a top wall 21 formed with a top wall recess 23 (see FIG. 7) to permit pivotment upwardly of the lock member 20, as illustrated. Spaced parallel side walls 24 are spaced apart a distance equal to the predetermined thickness of the legs 12 and 13. The side walls 24 include "L" shaped slots 25 directed inwardly from a lower edge of each side wall, wherein the slots and their entrance through the lower edges of the locking member side walls are spaced from the pivot axle 22 a predetermined spacing equal to or less than a distance from the locking member pivot axle 22 to the aligned pins 17 to require compression or deflection of the legs towards one another, in a manner as illustrated in FIG. 4, to permit reception of the pin 17 within the "L" shaped slots 25.

Figure 12:
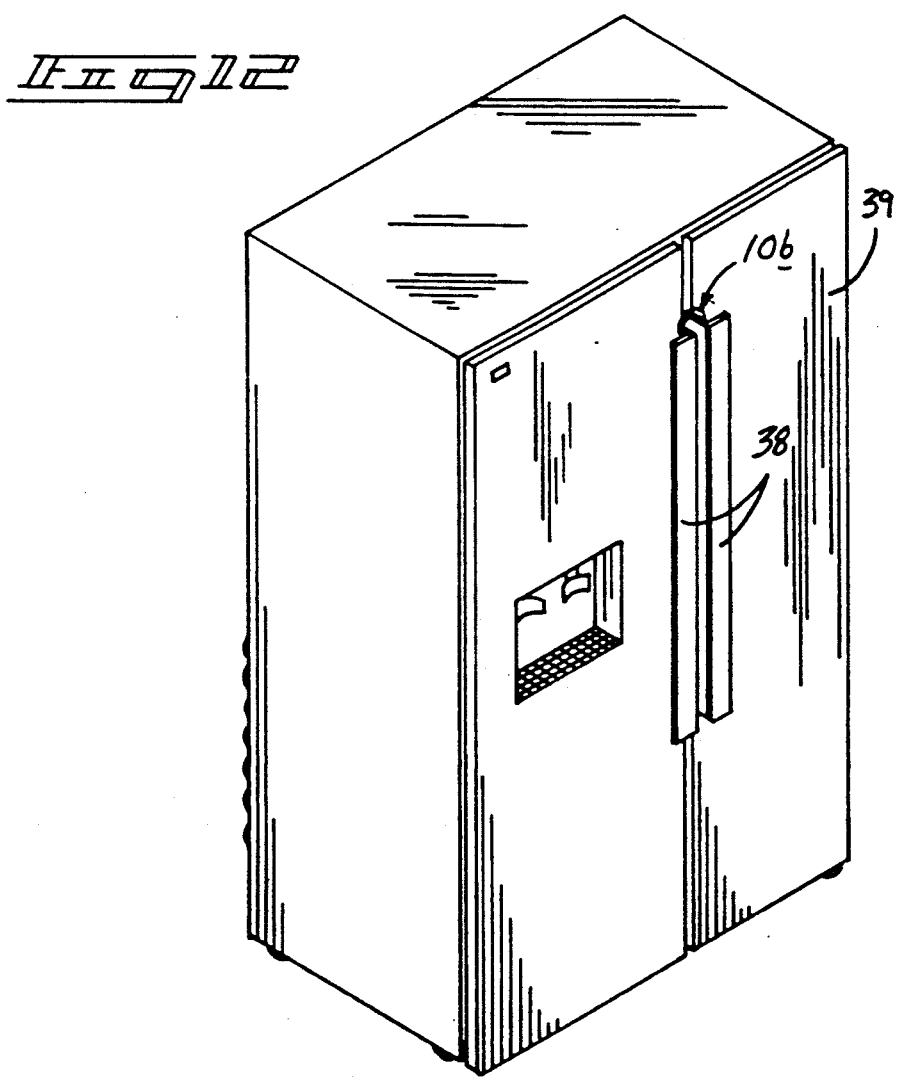
FIG. 12 is an isometric illustration of the invention mounted to an associated refrigerator door structure.

FIG. 9 illustrated a further modified apparatus 10b, including a right leg slot 26 coplanar with the plane 19 and positioned in an enclosed configuration spaced from the right leg lower distal end 16 within the right leg 12. An alarm 27 is mounted to the right leg and projects exteriorly of the right leg and is defined by a housing 28 to include a compressed air canister 29 mounted therewithin. The air canister 29 includes an air canister valve tube 30 reciprocatably mounted within the air canister 29, wherein projection of the valve tube 30 within the canister directs through the valve tube into an air horn 31 mounted at an upper terminal end of the valve tube 30. A megaphone 32 is mounted to the air horn 31 to enhance orientation and projection of the audible alarm directed through the air horn 31. An actuator plate 33 is fixedly secured to the valve tube 30 and includes an actuator plate pivot pin 34 to the pivotally mounted 33 within the housing 28 between the valve tube 30 and a forward wall of the housing 28 diametrically opposed to the leg 12 relative to the housing 28. The actuator plate 33 includes an actuator rod 35 mounted to a rear end portion of the acturator plate 33 remotely oriented relative to the actuator plate pivot pin 34, with the actuator rod 35 directed through the slot 26 and projecting within the "U" shaped door lock 11 between the right and left legs 12 and 13. The actuator rod 35 includes a friction pad 36 mounted to a free distal end of the actuator rod 35 between the right and left legs 12 and 13 adjacent the right leg 12, with the friction pad 36 including a plurality of ribs 37 mounted thereon to enhance engagement with an interior surface of the door handle, such as illustrated in FIG. 12. A spring member 40 mounted within the leg 12 between the lower distal end 16 and the actuator rod 35 normally biases the actuator 35 upwardly within the slot 26, whereupon attempted removal of the apparatus 10b relative to the door handles 38 of the refrigerator 39 effects downward projection of the friction pad 36 and deflection of the associated actuator rod 35 and actuator plate 33 to effect downwardly projection of the air canister valve tube 30 within the air canister directing compressed air into the air horn 31 effecting an audible alarm.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A refrigerator door lock apparatus, comprising, a U-shaped door lock including a right leg member defined along a right axis, and a left leg member defined along a left axis, the right and left leg members joined together by a connecting web, wherein the U-shaped door lock is formed of a shape retentent material effecting spring back of the right and left leg members upon compression of the right and left leg member toward one another, wherein the right leg member axis and the left leg member axis are defined along a common plane, and a plurality of coaxially aligned pins fixedly mounted to the left leg member adjacent a left leg member lower terminal end, wherein the coaxially aligned pins are arranged to project exteriorly of the left leg member from diametrically opposed sides thereof, wherein the pins are orthogonally oriented relative to the common plane, and a pivot axle fixedly mounted to the right leg member adjacent a right leg member lower terminal end, wherein the pivot axle is arranged parallel to the pins, wherein the pivot axle mounts a locking member, the locking member including a top wall and spaced parallel side walls, wherein the spaced parallel side walls are spaced apart a predetermined distance and the right and left leg members are defined by a predetermined thickness, wherein the predetermined distance is substantially equal to the predetermined thickness, and each side wall includes a side wall lower edge spaced from the top wall, and the side wall lower edge includes an L-shaped slot, and each slot is spaced from the pivot axle a predetermined spacing, and the pivot axle is spaced from the pins a further spacing greater than the predetermined spacing to require deflection of the right and left legs towards one another to permit reception of the pins within the L-shaped slots.

2. An apparatus as set forth in claim 1 wherein the right leg member further includes a right leg enclosed slot coplanar with the common plane directed through the right leg and diametrically aligned with an alarm housing, the alarm housing directing exteriorly of the "U" shaped door lock, and the alarm housing including a compressed air canister fixedly mounted therewithin, and the compressed air canister including an air canister valve tube reciprocatably mounted within the compressed air canister to permit directing of compressed air through the valve tube upon projection of the valve tube within the compressed air canister, and an air horn fixedly mounted at an upper terminal end of the valve tube to effect actuation of the air horn upon directing of compressed air through the valve tube, and an actuator plate mounted to the valve tube, the actuator plate including an actuator plate pivot pin pivotally mounting the actuator plate within the alarm housing, and the pivot pin positioned between the air canister valve tube and a forward wall of the alarm housing diametrically opposed to the right leg, and an actuator rod, the actuator including a forward end fixedly mounted to the actuator plate between the air horn and the right leg, and the actuator rod directed through the enclosed slot projecting between the right leg member and the left leg member defining a rear distal end of the actuator rod, and the rear distal end of the actuator rod includes a friction fixedly mounted to the actuator rod for engagement with an interior surface of a door handle of an associated refrigerator, wherein downward deflection of the actuator rod effects displacement of the air canister valve tube within the air canister to direct compressed air through the air horn to provide for an audible alarm.

* * * * *